(12) United States Patent
Shen et al.

(10) Patent No.: US 11,892,833 B2
(45) Date of Patent: Feb. 6, 2024

(54) AGRICULTURAL AMPHIBIOUS BAIT FEEDING BOAT CAPABLE OF MOVING BETWEEN PONDS AND METHOD FOR CONTROLLING SAME

(71) Applicant: JIANGSU UNIVERSITY, Zhenjiang (CN)

(72) Inventors: Yue Shen, Zhenjiang (CN); Lingfei Zhang, Zhenjiang (CN); Zhixiang Shi, Zhenjiang (CN); Minghui Liu, Zhenjiang (CN); Jincheng Chu, Zhenjiang (CN); Yayun Shen, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/928,280

(22) PCT Filed: Apr. 12, 2022

(86) PCT No.: PCT/CN2022/076344
§ 371 (c)(1),
(2) Date: Nov. 29, 2022

(87) PCT Pub. No.: WO2022/227795
PCT Pub. Date: Nov. 3, 2022

(65) Prior Publication Data
US 2023/0221717 A1    Jul. 13, 2023

(30) Foreign Application Priority Data
Apr. 26, 2021 (CN) .......................... 202110457121.9

(51) Int. Cl.
*G05D 1/00* (2006.01)
*A01K 61/80* (2017.01)
*B60F 5/00* (2006.01)
(Continued)

(52) U.S. Cl.
CPC ........... *G05D 1/0022* (2013.01); *A01K 61/80* (2017.01); *B60F 5/003* (2013.01); *B60L 15/20* (2013.01);
(Continued)

(58) Field of Classification Search
CPC .... G05D 1/0022; B60L 2200/32; A01K 61/80
See application file for complete search history.

(56) References Cited

U.S. PATENT DOCUMENTS 4,872,413 A * 10/1989 Hebert .................... B63B 35/14
                                                                440/12.7
6,112,450 A *  9/2000 Studanski .............. A01K 91/08
                                                                43/42.22
(Continued)

FOREIGN PATENT DOCUMENTS

CN    203528772 U    4/2014
CN    103786838 A    5/2014
(Continued)

*Primary Examiner* — S. Joseph Morano
*Assistant Examiner* — Jovon E Hayes
(74) *Attorney, Agent, or Firm* — Bayramoglu Law Offices LLC

(57) ABSTRACT

An agricultural amphibious bait feeding boat includes a boat body. A bait feeding device is fixed to one end of the boat body, and a propulsion device is fixed to the other end of the boat body. The boat body includes two foam floating bodies, foam fixing carbon rods, a transverse carbon rod, tube ferrule fixing assemblies, and tee joints. The two foam floating bodies include a left foam floating body and a right foam floating body, the foam fixing carbon rods parallel to each other are respectively arranged above the two foam floating bodies, and the foam floating bodies and the foam fixing carbon rods are fixed through the tube ferrule fixing assemblies. The transverse carbon rod is connected to the foam fixing carbon rods through the tee joints, and the left foam floating body and the right foam floating body are fixedly connected to each other.

10 Claims, 5 Drawing Sheets

(51) Int. Cl.
*B60L 15/20* (2006.01)
*B63B 1/12* (2006.01)
*B63B 5/24* (2006.01)
*B63B 35/00* (2020.01)
*G05D 1/10* (2006.01)

(52) U.S. Cl.
CPC .............. *B63B 1/121* (2013.01); *B63B 5/24* (2013.01); *B63B 35/00* (2013.01); *G05D 1/101* (2013.01); *B60L 2200/10* (2013.01); *B60L 2200/32* (2013.01); *B63B 2001/123* (2013.01); *B63B 2035/008* (2013.01)

(56) References Cited

U.S. PATENT DOCUMENTS

| | | | | |
|---|---|---|---|---|
| 7,152,363 B1* | 12/2006 | Garcia-Cruz | .......... | A01K 97/02 43/44.99 |
| 7,225,583 B1* | 6/2007 | Stacy | .......... | A01K 97/02 43/44.99 |
| 8,109,033 B1* | 2/2012 | Allyn | .......... | A01K 91/18 43/27.4 |
| 10,130,087 B1* | 11/2018 | Alas, Jr. | .......... | B63B 35/14 |
| 11,678,651 B1* | 6/2023 | Chess | .......... | B63B 35/14 43/44.99 |
| 2009/0025271 A1* | 1/2009 | Duckworth | .......... | A01K 97/02 43/44.99 |
| 2010/0115821 A1* | 5/2010 | Carlson | .......... | A01K 85/16 43/4.5 |
| 2016/0192631 A1* | 7/2016 | Jenkins | .......... | B65D 83/0005 43/4.5 |

FOREIGN PATENT DOCUMENTS

| | | |
|---|---|---|
| CN | 106417137 A | 2/2017 |
| CN | 109956020 A | 7/2019 |
| CN | 110341896 A | 10/2019 |
| CN | 110720286 A | 1/2020 |
| CN | 113212667 A | 8/2021 |
| WO | 2012032198 A2 | 3/2012 |

* cited by examiner

AGRICULTURAL AMPHIBIOUS BAIT FEEDING BOAT CAPABLE OF MOVING BETWEEN PONDS AND METHOD FOR CONTROLLING SAME

CROSS REFERENCE TO THE RELATED APPLICATIONS

This application is the national phase entry of International Application No. PCT/CN2022/076344, filed on Apr. 12, 2022, which is based upon and claims priority to Chinese Patent Application No. 202110457121.9, filed on Apr. 26, 2021, the entire contents of which are incorporated herein by reference.

TECHNICAL FIELD

The present disclosure relates to the technical field of agricultural machinery, and in particular, relates to an agricultural amphibious bait feeding boat capable of moving between ponds and a method for controlling the same.

BACKGROUND

Since shrimps and crabs usually move slowly at the bottom of a lake, baits cannot be evenly fed by a fixed bait feeding machine. As a result, the shrimps and crabs are likely to kill each other for food due to a lack of baits, and the coverage rate of water grass in the area is increased. The traditional method of manual bait feeding requires a lot of labor and has low operating efficiency. With a shortage of labor force and a continuous increase of culture costs, there is a growing need to develop a remote-controlled mobile bait feeding boat.

In the culture process of the shrimps and crabs, to prevent the shrimps and crabs from escape, plastic films or calcium-plastic boards or other materials are typically used to build an anti-escape wall of 50 cm. Sometimes, in order to cope with severe weather such as a flood season and a typhoon, high ridges are built to prevent the shrimps and crabs from escape due to overflow of water in lakes or ponds, which may otherwise cause the loss of aquaculture.

A bait feeding boat designed in Chinese Patent CN203528772 is large in size and has a propulsion device located below the water surface. Especially in an area having dense water grass, a propeller is likely to be entangled and cannot rotate properly. Meanwhile, especially for many scattered shrimp and crab mixed-cultured ponds, the bait feeding boat is unable to move between ponds.

The traditional aerodynamic boat is based on an aerodynamic theory. A propeller is driven by an internal combustion engine or a motor on the upper portion of the boat body to generate a propulsive force, and a steering gear at the tail portion of the boat body controls the direction. All propulsion devices and steering devices are arranged on the deck. This aerodynamic boat has high maneuverability and strong operability. However, the aerodynamic boat is rarely used for crabs cultured in ponds.

An aerodynamic boat designed in Chinese Patent CN109956020 can smoothly move forwards in an intertidal zone, a shoal, and a water area having a complex water bottom situation. However, the boat bottom is made from ultra-high molecular polymer plastics or polymers in most cases, resulting in relatively high costs. Meanwhile, the aerodynamic boat needs to be driven by professional drivers, which requires a lot of manpower and material resources.

Currently, there is no remote-controlled aerodynamic boat capable of feeding baits and moving between ponds in the domestic market. Compared with the traditional bait feeding boat and the traditional aerodynamic boat, a bait feeding boat of the present disclosure has lower costs and more outstanding reliability. According to the present disclosure, baits can be evenly fed in complex water areas of the shrimp and crab mixed-cultured ponds; moreover, the problem can be solved that a large quantity of manpower and tools are needed to make the bait feeding boat move between ponds when a high ridge exists between the ponds. The present disclosure has a great application prospect on shrimp and crab culture, especially on the shrimp and crab culture in multiple lakes and ponds.

SUMMARY

The objective of the present disclosure is to provide an agricultural water-air amphibious bait feeding boat having strong operability, low costs, and outstanding reliability. By adoption of aerodynamics, the situation of excessive water grass can be effectively avoided. Thus, the present disclosure is adapted to a complex water environment. Different from the traditional aerodynamic boat, the bait feeding boat of the present disclosure adopts dual motors for driving and a propulsion device designed integrally. The structural feature of the present disclosure lies in that both the propulsion device and a bait feeding device are detachable. By replacing the bait feeding device with another propulsion device, the bait feeding boat can move between ponds. According to the present disclosure, the strong operability is achieved; and the propulsion device can be shared, so that the cost is greatly saved.

The present disclosure adopts the following technical solutions.

An agricultural amphibious bait feeding boat capable of moving between ponds is provided, including a boat body, where a bait feeding device is fixed to one end of the boat body, and a propulsion device is fixed to the other end of the boat body. The boat body includes two foam floating bodies, foam fixing carbon rods, a transverse carbon rod, tube ferrule fixing assemblies, and tee joints, where the two foam floating bodies include a left foam floating body and a right foam floating body, the foam fixing carbon rods parallel to each other are respectively arranged above the two foam floating bodies, and the foam floating bodies and the foam fixing carbon rods are fixed through the tube ferrule fixing assemblies; and the transverse carbon rod is connected to the foam fixing carbon rods through the tee joints, such that an overall structure is in an H shape, and the left foam floating body and the right foam floating body are fixedly connected to each other. The bait feeding device includes a bait feeding mechanism, a microprocessor for controlling bait feeding, a bait feeding mechanism fixing plate, quick release extension rods, tube clamps, and quick release assemblies, where the microprocessor for controlling bait feeding is located above the bait feeding mechanism; the bait feeding mechanism is fixed to the bait feeding mechanism fixing plate via a screw hole; the quick release extension rods are fixedly connected to the bait feeding mechanism fixing plate through the tube clamps, and the quick release extension rods are fixedly connected to the quick release assemblies, respectively. The propulsion device includes a rotating mechanism, rotating mechanism fixing rods, a main rod of the propulsion device, short connecting rods, a main control fixing plate, a battery fixing plate, tube clamps, and a nylon column, where each of the short connecting rods has one end connected to a respective one of the foam fixing carbon rods through a respective one of quick release assemblies, and the other end connected to the main rod of the propulsion device through a respective one of tee joints; the battery fixing plate is fixed to the main rod of the propulsion device through the tube clamps for an arrangement of a battery and other components; the main control fixing plate is erected at a center of the battery fixing plate with the nylon column for an arrangement of a main control board; and a left end and a right end of the main rod of the propulsion device are respectively provided with the tee joints, and are perpendicularly connected to the rotating mechanism fixing rods, respectively.

Further, each of the foam floating bodies is cylinder-like and has a length of 1 m and a diameter of 33 cm; and an upper portion of each of the foam floating bodies is cut to form an 18 cm wide platform to be fixed to a respective one of the foam fixing carbon rods.

Further, each of the quick release assemblies includes a quick release threaded tube, a quick release pin tube, and a threaded flange, where two recessed positioning holes are formed in a bottom of the quick release threaded tube, and correspond to two pins protruding from a top surface of the quick release pin tube. During fixing, the pins are respectively inserted into the recessed positioning holes to ensure that the quick release threaded tube and the quick release pin tube are unable to rotate relative to each other. Then, the threaded flange is fixed to a lower threaded surface of the quick release threaded tube in a direction of the quick release pin tube, and the quick release threaded tube and the quick release pin tube are completely fixed by a baffle plate below the threaded flange. During disassembly, the threaded flange is detached along threads of the quick release threaded tube, and the quick release threaded tube and the quick release pin tube are separated from each other.

Further, each of the tube ferrule fixing assemblies includes a tube ferrule, tube ferrule fixing plates, tube clamps, and M3 screws, where a stainless steel strip is used as the tube ferrule, and four holes are reserved at each of two ends of the tube ferrule, and are matched with a respective one of the tube ferrule fixing plates; four holes are formed in each of the tube ferrule fixing plates, and distances between the four holes correspond to distances between holes in the tube clamps; and each of the M3 screws sequentially penetrates through a respective one of the tube clamps, and the two ends of the tube ferrule and the tube ferrule fixing plates that are symmetrical with respect to the respective one of the tube clamps, and is tightened by a nut, such that each of the foam floating bodies and a respective one of the foam fixing carbon rods are fixedly connected to each other.

Further, the transverse carbon rod is connected to the foam fixing carbon rods through the tee joints, screws having a length of 35 mm, and nuts.

Further, an angle of the umbrella-shaped foldable component is arbitrarily adjusted from 0° to 90°. When the boat body is shifted from a mode of bait feeding to a mode of moving between ponds, the bait feeding device is detached, and another propulsion device is mounted. After the angle of the umbrella-shaped foldable component is manually adjusted, the motor is allowed to rotate to provide a lift force.

Further, the rotating mechanism includes mechanical parts and an electric connection part; where, each of the mechanical parts includes a motor, a propeller blade, a motor base plate, a foldable component base plate, a tube clamp, an umbrella-shaped foldable component, a foldable component fixing plate, and a fixing aluminum component, where the propeller blade is fixed to a shaft end of the motor; the motor is fixed to the motor base plate; the foldable component base plate is connected to the motor base plate through the tube clamp, and the foldable component base plate is perpendicularly connected to the foldable component fixing plate through the fixing aluminum component; the foldable component fixing plate is provided with a screw hole matched with the umbrella-shaped foldable component, such that the umbrella-shaped foldable component is fixed to the foldable component fixing plate through a screw; and the umbrella-shaped foldable component is fixed to a respective one of the rotating mechanism fixing rods by punching a hole and screwing through the hole; and the electric connection part includes a battery, two electronic speed controllers, a power distribution board, a voltage reduction module, and a main control board, where the battery is connected to the power distribution board; multiple power supplies from the power distribution board are respectively connected to the electronic speed controllers and the voltage reduction module; and the voltage reduction module reduces a voltage of the battery to 5 V and then connects the battery to the main control board. Wires led from the power distribution board are connected to the two electronic speed controllers; each of the electronic speed controllers converts a direct current into a three-phase current, and is connected to the respective motor through a wire to adjust a rotation speed of the propeller blade; and the main control board is configured to adjust and control a rotation speed of the propulsion device according to sensor data, such that an attitude of the boat body is kept stable; the battery fixing plate is fixed to the main rod of the propulsion device through the tube clamps at an included angle of 90° to a ground; the electronic speed controllers, the power distribution board, the battery, and the voltage reduction module are sequentially fixed to the battery fixing plate through M3 screws or double-sided adhesives; the main control fixing plate is erected with the nylon column through an M3 screw, and is fixed to the center of the battery fixing plate; and the main control board is bonded to the main control fixing plate through a double-sided adhesive.

A method for controlling the agricultural amphibious bait feeding boat capable of moving between ponds of the present disclosure is provided, including:

step 1, turning on a main power switch to power on the motor and the main control board;

step 2, adjusting a throttle value on a remote controller to a minimum value, and controlling the motor to have a basic rotation speed by the main control board through a respective one of the electronic speed controllers, step 3, taking a microprocessor on the main control board of the propulsion device as a host by default, and taking the microprocessor on a main control board of the bait feeding device, namely the microprocessor for controlling bait feeding, as a slave by default;

step 4, solving the attitude of the boat body and transmitting data to the microprocessor as the host by an inertial measurement unit (IMU) based attitude estimation module on the host, and displaying the data on a serial port screen by the microprocessor as the host;

step 5, analyzing and processing the transmitted data by the microprocessor as the host to adjust and control a rotation speed of the motor by proportion integration differentiation (PID), so as to make the boat body smoothly move forwards in a whole; where when the boat body smoothly moves forwards, turning and bait feeding are fulfilled by the remote controller;

step 6, sending commands for the turning and the bait feeding by the remote controller;

step 7, receiving data and transmitting the data to the main control board having the host by a remote controller receiving module; and step 8, adjusting, according to the commands, an attitude expectation of the boat body by the main control board having the host, and sending a command by the main control board having the host to the slave to control the motor or the bait feeding mechanism.

Further, the method further includes a step of mounting two propulsion devices to make the agricultural amphibious bait feeding boat rapidly move between ponds, including the following steps:

step 9, detaching the bait feeding device, mounting another one of the propulsion devices, and rotating an orientation of each motor;

step 10, configuring the host and the slave;

step 11, switching to a quadrotor mode by using the remote controller, and sending a command of take-off to the agricultural amphibious bait feeding boat; and step 12, enabling the agricultural amphibious bait feeding boat to take off and move to another pond.

Further, the step 3 specifically includes the following steps:

step a, turning on a power switch of the slave, such that a red-green-blue (RGB) lamp on the main control board having the slave flashes in a green color;

step b, after waiting for 30 seconds, turning on a power switch of the host; and step c, if a match between the host and the slave is completed, giving prompts by a buzzer on the main control board having the host and a buzzer on the main control board having the slave, and keeping the RGB lamp on in the green color constantly; and if the match fails, performing a power cut for resetting and rematch.

The present disclosure has the following beneficial effects.

(1) According to the agricultural amphibious bait feeding boat capable of moving between ponds of the present disclosure, a navigation track can be planned by manual remote control, so that the amphibious bait feeding boat can greatly meet the requirement of a user and completely replace time-consuming and labor-consuming manual bait feeding operation.

(2) The propulsion device of the present disclosure adopts the aerodynamics, and the motor drives the propeller blade to form a backward air flow, so as to propel the boat body to move forwards. Meanwhile, the difference of rotation speeds of the motors on two sides can be changed to complete the turning of the boat body. Only a small part of the boat body is underwater during navigation. Thus, the situation that the amphibious bait feeding boat is unable to move forwards and backwards because the underwater propeller blade is entangled with the water grass is prevented from occurring.

(3) Both the bait feeding device and the propulsion device of the present disclosure are modularized, so as to be convenient to assemble and disassemble. During assembly, only the quick release assemblies in the module and the quick release assemblies on the boat body need to be tightened. Thus, easiness for operation and firm connection are achieved. The modules on the bait feeding boat are perfectly compatible with another identical bait feeding boat. Thus, the use cost is greatly reduced.

(4) According to the agricultural amphibious bait feeding boat capable of moving between ponds of the present disclosure, one main control board controls a pair of motors, and the other main control board controls a particle spreader. The microprocessor on the main control board of the propulsion device is taken as the host by default, and the microprocessor on the main control board of the bait feeding device is taken as the slave by default. Only after the host and the slave are configured, the bait feeding boat can operate normally. When the host is faulty, the slave makes a response of a power cut to reduce the loss of feed.

(5) The bait feeding boat can move between ponds. Thus, the burden of the user is decreased, and the operation cost of multiple fish ponds is reduced. Only one group of bait feeding modules need to be carried to complete bait feeding operation of multiple crab ponds. Thus, the cost of building a special passage for a boat to move between ponds or using multiple bait feeding boats is saved.

(6) Different from an unmanned aerial vehicle (UAV), the amphibious bait feeding boat of the present disclosure adopts the aerodynamics and operates in water, is propelled by both the propulsion device and a water flow to move forwards, and is unnecessary to navigate at a very high speed. Besides, an assault boat structure of the traditional small boat is abandoned, and only a pair of foam floating cylinders are used as s main body of the bait feeding boat, and an operation structure is built on the foam floating cylinders by using carbon tubes. In this way, when the particle spreader is fully loaded, a total weight of the bait feeding boat is not more than 15 kg. Thus, the power needed by propelling the boat body to navigate is greatly reduced compared with that needed by driving an aircraft to fly. It can be seen that the bait feeding boat of the present disclosure obviously has longer battery life compared with the aircraft in a case where batteries with the same specification are used.

(7) The present disclosure adopts lightweight design. In a case of no load, the particle spreader used is only 1.14 kg, and the total weight of the boat body is not more than 10 kg. Thus, the bait feeding boat can be easily carried by the user when entering the pond for the first time or tending to be stored for a long time.

Figure 1:
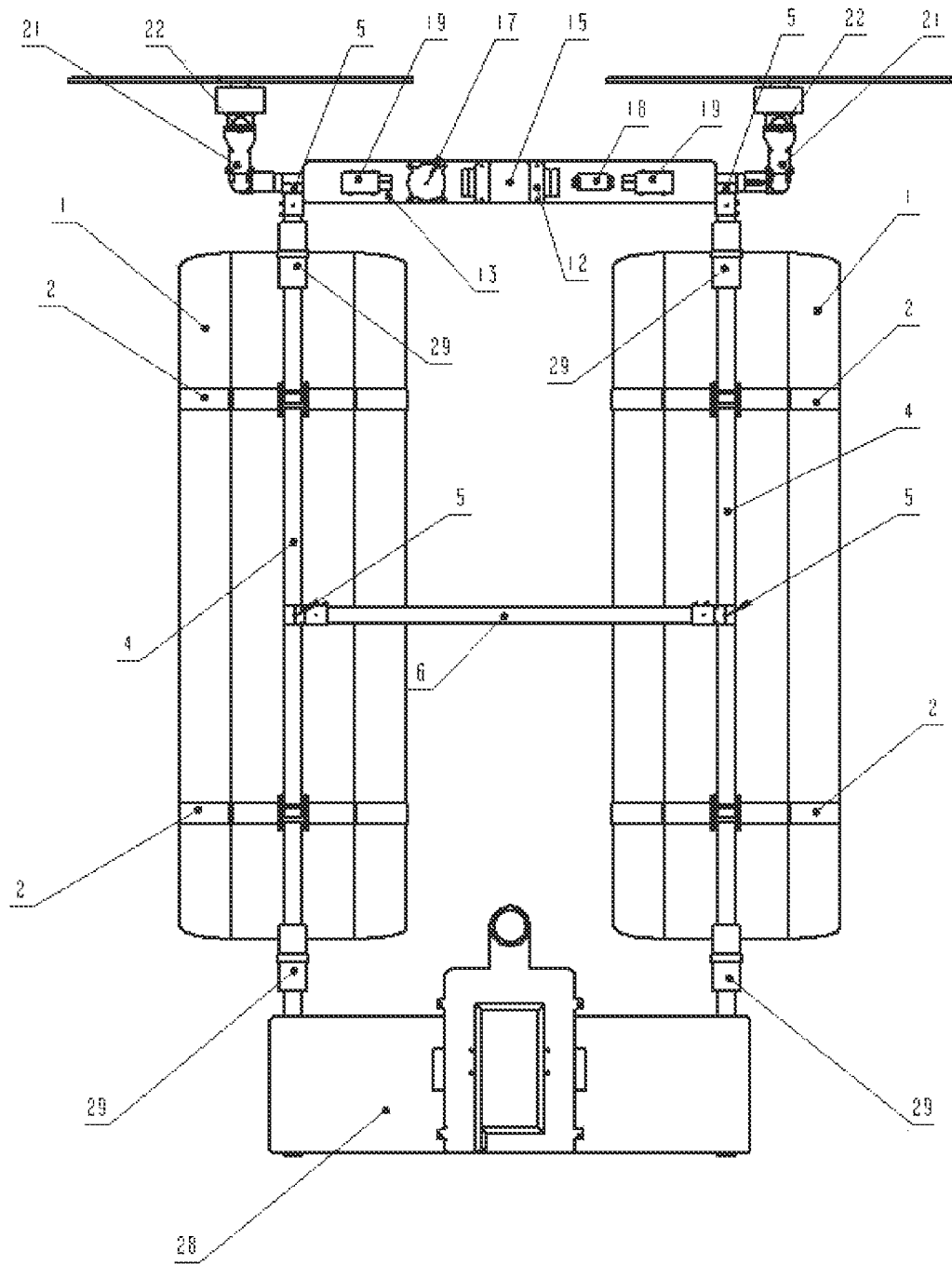
FIG. 1 is a top view of a mechanism of an agricultural amphibious bait feeding boat and a left view of some important structures.

In the drawings: 1. foam floating body, 2. tube ferrule, 3. tube clamp, 4. foam fixing carbon rod, 5. tee joint, 6. transverse carbon rod, 7. tube ferrule fixing plate, 8. microprocessor for controlling bait feeding, 9. bait feeding mechanism, 10. short connecting rod, 11. main rod of a propulsion device, 12. main control fixing plate, 13. battery fixing plate, 14. rotating mechanism fixing rod, 15. main control board, 16. battery, 17. power distribution board, 18. voltage reduction module, 19. electronic speed controller, 20. umbrella-shaped foldable component, 21. foldable component fixing plate, 22. fixing aluminum component, 23. foldable component base plate, 24. motor base plate, 25. motor, 26. propeller blade, 27. quick release extension rod, 28. bait feeding mechanism fixing plate, 29. quick release assembly, 30. quick release threaded tube, 31. quick release pin tube, and 32. threaded flange.

DETAILED DESCRIPTION OF THE EMBODIMENTS

The operating process of an agricultural amphibious bait feeding boat of the present disclosure is described in detail in combination with the schematic diagrams.

Referring to FIG. 1 showing a top view of a mechanism of an agricultural amphibious bait feeding boat, the mechanism includes 17 parts, namely two foam floating bodies (1) including a left foam floating body (1) and a right foam floating body (1), foam fixing carbon rods (4), tee joints (5), a transverse carbon rod (6), tube ferrules (2), tube clamps (3), tube ferrule fixing plates (7), quick release assemblies (29), a rotating mechanism, rotating mechanism fixing rods (14), a main rod (11) of a propulsion device, short connecting rods (10) including a left short connecting rod and a right short connecting rod, and the like. The two foam floating bodies are parallel to each other; a front portion and rear portion of each foam floating body are symmetrically fixed to the corresponding foam fixing carbon rod through the corresponding tube ferrule, tube clamps, and tube ferrule fixing plates; and two ends of the foam fixing carbon rod slightly exceed the foam floating body, such that relative positions of each set of foam floating body and foam fixing carbon rod are determined. The transverse carbon rod is fixed to centers of the two foam fixing carbon rods in a plane parallel to top surfaces of the foam floating bodies through two tee joints and M3 screws via positioning holes in the tee joints, so as to ensure that the top surfaces of the left foam floating body and the right foam floating body are parallel to a plane in which a carbon rod frame is built. One end of each of the quick release assemblies is mounted to a front end of a respective one of the foam fixing carbon rods, the other end of each of the quick release assemblies is connected to a respective one of the short connecting rods, and the fixed connection at two ends of each of the quick release assemblies is fulfilled through M3 screws via positioning holes in the two ends of each of the quick release assemblies. A threaded flange ring is connected to a corresponding threaded section of each of the quick release assemblies, such that the detachable connection of the two foam fixing carbon rods is completed. As long as the threaded flange ring on each of the quick release assemblies is detached, a part, connected to a respective one of the short connecting rods, of each of the quick release assemblies can be detached. Even if the bait feeding boat is in water, the disassembly can be easily completed; and the detached threaded flange ring is blocked by the fixing screw and thus cannot fall into the water. Two tee joints having concentric through holes in their front portions are fixed to front ends the left short connecting rod and the right short connecting rod through M3 screws via positioning holes, respectively. The main rod of the propulsion device horizontally penetrates through the left tee joint and the right tee joint and keeps the left tee joint and the right tee joint symmetrical; the main rod of the propulsion device has two ends exceeding the tee joints by 10 cm, and is fixed to the tee joints through M3 screws via positioning holes. After the quick release assemblies are mounted, the overall structure is more stable by means of additional fixation of the main rod of the propulsion device. The two tee joints are fixed to the two ends of the main rod of the propulsion device through the M3 screws via the positioning holes, three-way rotor mechanism fixing rods are perpendicularly fixed to the left tee joint and the right tee joint, and the overall height of the propulsion device can be controlled by tightening the screws, such that heights of propeller blades are adjustable. Rotor structures are mounted at upper ends of the three-way rotor mechanism fixing rods through M3 screws via positioning holes, such that the heights of the propeller blades can be arbitrarily adjusted. By adoption of an umbrella-shaped foldable component in the rotor structure, the propeller blade can be fixed in a state of bending forwards at an angle of 90° or be fixed in a vertical state. When fixed in the state of bending forwards at the angle of 90°, the propeller blade is controlled by a propulsion device to push wind backwards, so as to propel a boat body to move forwards. In this way, the propeller blade is prevented from being extremely low or extremely high, which may otherwise result in that the propeller blade touches the water or causes overturning of the bait feeding boat.

Figure 2:
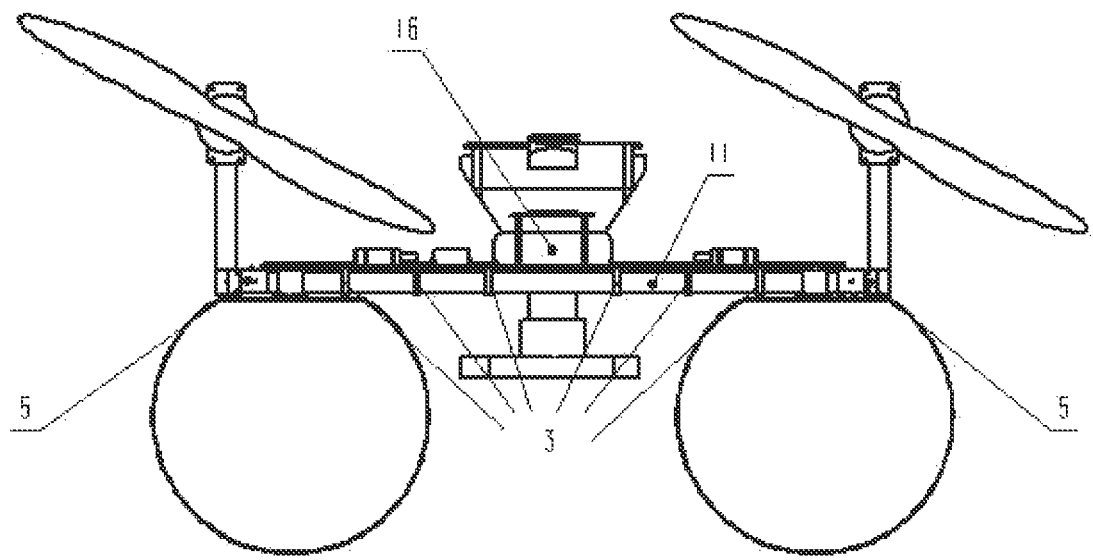
FIG. 2 is a front view of a control part of the mechanism of the agricultural amphibious bait feeding boat.

Referring to FIG. 2 showing a front view of a control part of the mechanism of the agricultural amphibious bait feeding boat, the control part includes a main control fixing plate (12), a battery fixing plate (13), a battery (16), two electronic speed controllers (19), a power distribution board (17), a voltage reduction module (18), a main control board (15) and motors (25). The battery fixing plate is fixed to the main rod of the propulsion device via six sets of positioning holes in the battery fixing plate and six tube clamps (the battery fixing plate 13 is fixed to the main rod 11 of the propulsion device through the tube clamps 3, M3 screws having a length of 45 mm, and nuts at an included angle of 90° to the ground). One battery, one power distribution board, one voltage reduction module, and the two electronic speed controllers are positioned on the battery fixing plate by bonding or punching. The main control fixing plate of 100*60 mm is erected at the center of the battery fixing plate with a nylon column, and is vertically fixed through an M3 screws via a threaded hole in the nylon column. The main control board is bonded at the center of the main control fixing plate. A positive electrode and negative electrode of the battery are connected to the power distribution board through wires. In this way, power interfaces are increased, and a current is stabilized. The power distribution board leads wires to the two electronic speed controllers; and each of the electronic speed controllers converts a direct current into a three-phase current, and is connected to the respective motor through a wire to control a rotation speed of the propeller blade. The power distribution board also leads a wire to the voltage reduction module and then to a power interface of the main control board; and a pulse-width modulation (PWM) channel of the main control board is connected to a PWM signal wire of the electronic speed controller, so as to achieve a control over the motor. Thus, the movement of the bait feeding boat can be remotely controlled and adjusted by wireless communication. The main control board 15 is bonded to the main control fixing plate 12 through a 3M double-sided adhesive having a thickness of 1 cm.

Figure 3:
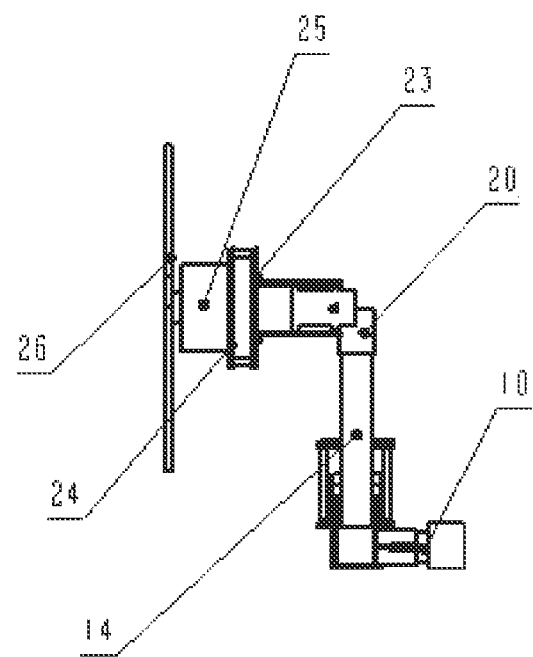
FIG. 3 is a left view of a rotating mechanism of the mechanism of the agricultural amphibious bait feeding boat.

Referring to FIG. 3 showing a left view of the rotating mechanism of the agricultural amphibious bait feeding boat, the rotating mechanism includes the motor (25), the propeller blade (26), a motor base plate (24), a foldable component base plate (23), a tube clamp (3), the umbrella-shaped foldable component (20), a foldable component fixing plate (21), and a fixing aluminum component (22). The propeller blade is fixed to the motor through four M3 screws; the motor is fixed to the motor base plate through four M3 screws; and the foldable component base plate and the motor base plate are connected through the tube clamp, such that an influence of vibration caused by rotation of the motor on the rotating mechanism fixing rod is effectively reduced, and overall reliability is improved. The foldable component base plate and the foldable component fixing plate are perpendicularly connected through the fixing aluminum component; the foldable component fixing plate is provided with a screw hole matched with the umbrella-shaped foldable component, and thus the umbrella-shaped foldable component can be fixed to the foldable component fixing plate through the M3 screw; the umbrella-shaped foldable component is fixed to the rotating mechanism fixing rod by punching and in a way that an M3 screw having a length of 35 mm penetrates through a punched hole; and each side of the umbrella-shaped foldable component is tightened by two M3 screws, such that a connection clearance is reduced.

A cuboid aluminum strip having a length of 45 mm, a width of 5 mm, and a height of 5 mm is adopted as the fixing aluminum component 22, and threaded holes are formed in the cuboid aluminum strip. A surface of 45*5 mm of the fixing aluminum component is selected as a front surface; M3 threaded holes in a left end and a right end of the front surface are located at a position 3.5 mm away from a corresponding edge and a position 13.5 mm away from a corresponding edge; and M3 threaded holes in a left end and a right end of a top surface are located at positions 8.5 mm away from edges. Based on the match between the threaded holes and corresponding positioning holes in the foldable component fixing plate, the foldable component base plate and the foldable component fixing plate between which an angle of 90° is formed are fixed through screws and nuts.

Figure 4:
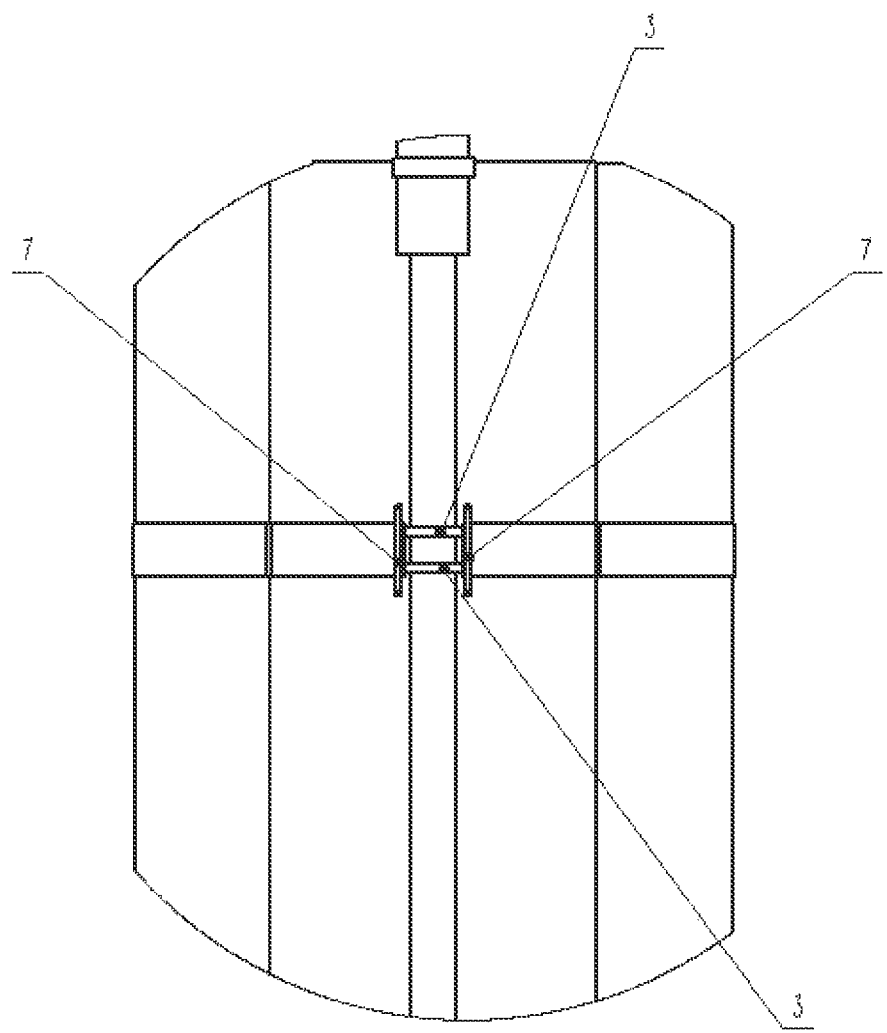
FIG. 4 is a partial enlarged view of a tube ferrule fixing structure of the mechanism of the agricultural amphibious bait feeding boat.

Referring to FIG. 4 showing a partial enlarged view of a tube ferrule fixing structure of the mechanism of the agricultural amphibious bait feeding boat, the tube ferrule fixing structure includes the tube ferrule fixing plates (7) including a first tube ferrule fixing plate and a second tube ferrule fixing plate, the tube ferrule (2), and the tube clamps (3). According to the distance between positioning holes in each of the tube clamps, two ends of the tube ferrule and the tube ferrule fixing plates are punched to form positioning holes. An M3 screw having a length of 45 mm is used to sequentially penetrate through the positioning holes in the first tube ferrule fixing plate, a section a of the tube ferrule, the tube clamp, a section b of the tube ferrule, and the second tube ferrule fixing plate, and is tightened by a nut. In this way, each of the foam floating bodies and a respective one of the foam fixing carbon rods are fixed together.

A tube ferrule fixing assembly includes the tube ferrule 2, the tube ferrule fixing plates 7, the tube clamps 3, and the screws, where a stainless steel strip having a width of 30 mm is used as the tube ferrule 2; four holes having a diameter of 3 mm are reserved at each of two ends of the tube ferrule 2, and are matched with the corresponding tube ferrule fixing plate 7; four holes having a diameter of 3 mm are formed in each of the tube ferrule fixing plates 7, and distances between the four holes correspond to distances between holes in the tube clamps; and an M3 screw having a length of 45 mm sequentially penetrates through a respective one of the tube clamps 3, and the two ends of the tube ferrule 2 and the tube ferrule fixing plates 7 that are symmetrical with respect to the respective one of the tube clamps 3, and is tightened by a nut, such that each of the foam floating bodies 1 and a respective one of the foam fixing carbon rods 4 are fixedly connected to each other.

Figure 5:
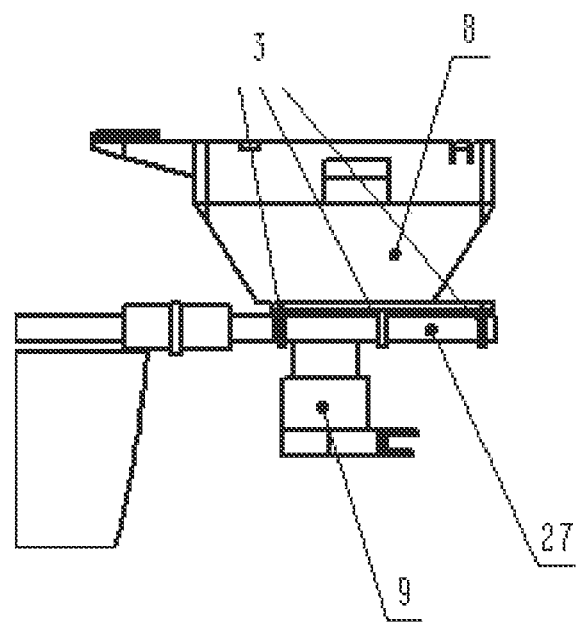
FIG. 5 is a left view of the control part of the mechanism of the agricultural amphibious bait feeding boat.

Referring to FIG. 5 showing a left view of the control part of the mechanism of the agricultural amphibious bait feeding boat, the control part includes the quick release assemblies (29), the tube clamps (3), a bait feeding mechanism (9), a microprocessor (8) for controlling bait feeding, a bait feeding mechanism fixing plate (28), and quick release extension rods (27) including a left quick release extension rod and a right quick release extension rod. One end of each of the quick release assemblies is mounted at a rear end of a respective one of the foam fixing carbon rods, the other end of each of the quick release assemblies is connected to a respective one of the quick release extension rods, and the fixation at two ends of each of the quick release assemblies is fulfilled through M3 screws via positioning holes. The bait feeding mechanism fixing plate is mounted on the left quick release extension rod and the right quick release extension rod through three tube clamps respectively according to positions of positioning holes in the bait feeding mechanism fixing plate. A rectangular groove is formed in the center of a side of the bait feeding mechanism fixing plate for the purpose of positioning. The microprocessor for controlling bait feeding and the bait feeding mechanism are mounted on the bait feeding mechanism fixing plate according to the position of the groove, and six M2 screws are screwed into the positioning holes at a lower end of the bait feeding mechanism fixing plate for the purpose of positioning. A bait feeding device and the propulsion device are respectively located at a front portion and rear portion of the bait feeding boat, such that the boat body is balanced in weight. Meanwhile, the bait feeding device and the propulsion device detachable structures are both detachable; and after disassembly, only a symmetrical boat body is retained, which is conducive to constructing a rising environment of four rotors.

The bait feeding mechanism (9) is fixed to the bait feeding mechanism fixing plate (28) through six M2 screw holes, and the bait feeding mechanism fixing plate (28) is fixedly connected to the quick release extension rods (27) through six tube clamps (3). The quick release extension rods (27) are effectively connected to the quick release assemblies (29), and the quick release extension rods (27) are fixedly connected to the quick release assemblies (29) through external threads, respectively. The bait feeding device is designed by utilizing a quick release structure, such that a front portion and rear portion of an airboat are balanced in weight, and particles are prevented from hitting the foam floating body (1) or rolling into the propeller blade (26) during the bait feeding of the bait feeding mechanism (9), so that stability of a system is improved.

Figure 6:
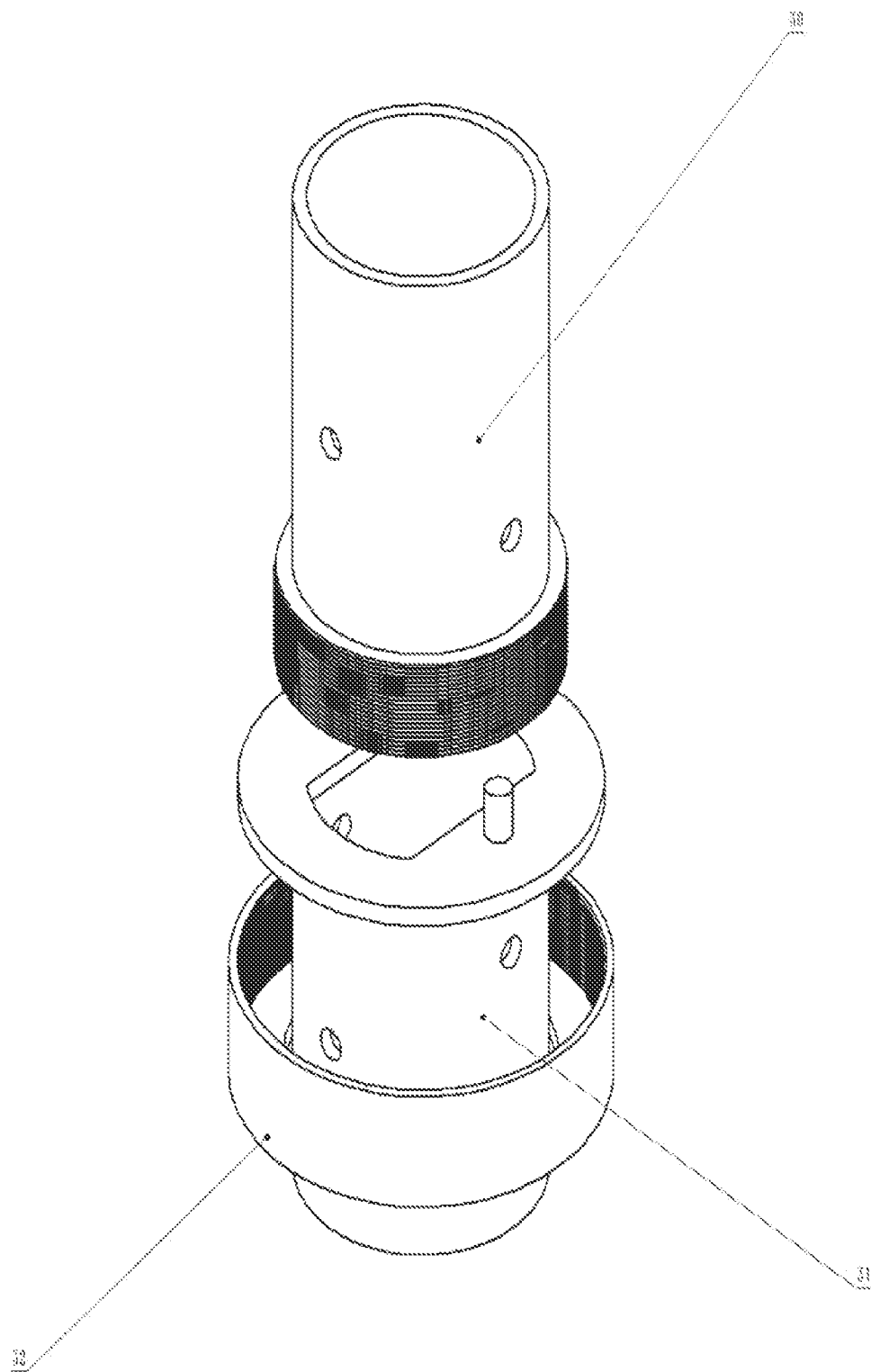
FIG. 6 is an exploded view of a quick release structure of the mechanism of the agricultural amphibious bait feeding boat.

Referring to FIG. 6 showing an exploded view of the quick release structure of the mechanism of the agricultural amphibious bait feeding boat, the quick release structure includes a quick release threaded tube (30), a quick release pin tube (31), and a threaded flange (32). Two recessed positioning holes are formed in a bottom of the quick release threaded tube, and correspond to the two pins protruding from a top surface of the quick release pin tube. When fixing is required, the pins are inserted into the recessed positioning holes to ensure that the quick release threaded tube (30) and the quick release pin tube (31) are unable to rotate relative to each other. Then the threaded flange is fixed to a lower threaded surface of the quick release threaded tube in a direction of the quick release pin tube, and the quick release threaded tube (30) and the quick release pin tube (31) can be completely fixed by a baffle plate below the threaded flange. During disassembly, as long as the threaded flange is detached along threads of the quick release threaded tube, the quick release threaded tube and the quick release pin tube can be separated from each other.

The propulsion device includes the rotating mechanism, the rotating mechanism fixing rods, the main rod of the propulsion device, the main control fixing plate, the battery fixing plate, tube clamps of the battery fixing plate, a copper cylinder, the battery, the electronic speed controllers, the power distribution board, the voltage reduction module, and the main control board.

The rotating mechanism fixing rods are connected to the main rod of the propulsion device through the tee joints, M3 screws having a length of 35 mm, and nuts. The battery fixing plate is fixed to the main rod of the propulsion device through the tube clamps for the battery fixing plate, M3 screws having a length of 45 mm, and nuts at an included angle of 90° to the ground. The electronic speed controllers, the power distribution board, the battery, and the voltage reduction module are sequentially fixed to the battery fixing plate through M3 screws or double-sided adhesives. The main control fixing plate is erected with the copper cylinder through M3 screws, and is fixed to the center of the battery fixing plate. The main control board is bonded to the main control fixing plate through a 3M double-sided adhesive having a thickness of 1 cm.

The microprocessor on the main control board adopts a STM32F4 chip and integrates high performance, a real-time function, digital signal processing, low power consumption, low-voltage operation, and other characteristics. Besides, the microprocessor on the main control board maintains high integration and easiness for development, and is suitable for various harsh operation environments out of doors. The main control board is provided with a variety of interfaces with different functions for sensor modules, and the interfaces are integrally designed, such that various sensors, connecting wires, and the like can be conveniently configured onboard. Where, the sensor modules include an IMU based attitude estimation module, a human-computer interaction module, a power management module, a wireless transceiver module, a remote control receiving module. In consideration of convenience of later debugging and loading of more powerful peripheral modules, multiple resources such as serial ports, inter-integrated circuits (IIC), and serial peripheral interfaces (SPI) are reserved. A highly integrated BMI088 chip circuit is adopted as the IMU based attitude estimation module to acquire basic attitude data of the boat body. The human-computer interaction module includes a high-brightness RGB indicator light, a passive buzzer, and a serial port screen, and is used to inform a basic state of the boat body. A linear power supply ASM117 is adopted as the power management module to stabilize a power supply current and supply electricity to a single chip microcomputer (SCM). A full-duplex high-speed wireless serial port module is adopted as the wireless transceiver module to perform cooperative communication between a front propulsion device and a rear propulsion device when the bait feeding boat moves between ponds. A wireless receiving device for a serial port of a remote controller is adopted as the remote control receiving module to receive a command sent from the remote controller.

Four power wires are led from the battery. Two of the power wires are connected to the power distribution board to shunt a heavy current over the motor, and the other two of the power wires are connected to the voltage reduction module to provide an input voltage to the voltage reduction module. The voltage reduction module reduces the input voltage and limits a current, and has an output terminal connected to the main control board through two 14 awg silicone wires. The power distribution board receives a voltage from a power supply terminal, and four power wires led from the power distribution board are connected to the two electronic speed controllers. The electronic speed controller is connected to two power input wires from the power distribution board, and is also connected to one signal input wire from the main control board and one analog signal ground wire; and three wires led from the electronic speed controller are directly connected to the motor.

Further, the propulsion device of the boat body is designed integrally and modularly. The propulsion device has own power supply and main control board. The main control board can adjust a rotation speed of the propulsion device according to sensor data, such that the attitude of the boat body is kept stable. Both the propulsion device and the bait feeding device on the boat body can be quickly detached. The detachable structures are provided with positioning holes and positioning pins, facilitating accurate positioning and quick assembly and disassembly. A thread structure connected to the detachable structure can effectively avoid reduction, caused by repeated assembly and disassembly, of positioning accuracy of the positioning pins.

Further, the power distribution board, the electronic speed controllers, and the main control board are subjected to water repellent treatment to a predetermined extent, and have a waterproof level of IP67, thus being able to be immersed in water for a short time. Due to aerodynamic design, most control devices are located above a water surface, so that the requirement for a waterproof level of the whole boat is not high.

Further, a wireless remote control module includes a handheld remote controller and the remote control receiving module. A user on the bank can control forward movement, turning, acceleration, deceleration, stop, bait feeding, and other functions of an unmanned boat by means of the remote controller. The maximum control range can reach 1 km. The wireless transceiver module automatically detects whether or not a device waiting for receiving exists in an ambient environment within 30 seconds after being powered on. If no device waiting for receiving exists in the ambient environment, the wireless transceiver module automatically turns off a wireless transmission function and enters a wait-for-receiving mode. If the device waiting for receiving exists in the ambient environment, the detecting device is taken as a host by default, and the receiving device is taken as a slave by default. The microprocessor of the bait feeding device is taken as the slave by default. A power switch controls turn-off of the motor and the main control board, so as to deal with some emergency situations in which the motor is out of control. When two propulsion devices are used at the same time, a host-slave relationship is set by turning off the power supply.

Further, a small unmanned air vehicle (SUAV) is adopted as a particle spreader; the SUAV has a bottom of a wheel disc structure, and is designed to have an adjustable opening angle of a hatch door and an adjustable rotation speed of a wheel disc. The user can change a duty cycle of an input PWM wave by setting a knob of a corresponding channel of the remote controller, so as to realize a stepless speed change and adjust the opening angle of the hatch door.

The present disclosure adopts the following technical solutions. A method for controlling an agricultural amphibious bait feeding boat capable of moving between ponds is provided, including the following steps.

Step 1, A main power switch is turned on to power on the motor and the main control board.

Step 2, A throttle value on a remote controller is adjusted to a minimum value, and the motor is controlled to have a basic rotation speed by the main control board through a respective one of the electronic speed controllers.

Step 3, A microprocessor on the main control board of the propulsion device is taken as a host by default, and the microprocessor on a main control board of the bait feeding device is taken as a slave by default.

Step 4, An IMU attitude estimation module on the host solves the attitude of the boat body and transmits data to the microprocessor as the host, and the data is displayed on a serial port screen by the microprocessor as the host.

Step 5, The microprocessor as the host analyzes and processes the transmitted data to adjust and control a rotation speed of the motor by PID, so as to make the boat body smoothly move forwards in a whole; where when the boat body smoothly moves forwards, turning, bait feeding, and other functions of the bait feeding boat can be fulfilled by means of the remote controller.

Step 6, The remote controller sends commands for turning, bait feeding, and the like.

Step 7, A remote controller receiving module receives data and transmits the data to the main control board having the host.

Step 8, The main control board having the host adjusts, according to the commands, an attitude expectation of the boat body, and sends a command to the slave to control the motor or the bait feeding mechanism.

In the present disclosure, two propulsion devices are mounted to make the bait feeding boat rapidly move between ponds, including the following steps.

Step 9, The bait feeding device is detached, another one of the propulsion devices is mounted, and an orientation of each motor is rotated.

Step 10, The host and the slave are configured.

Step 11, The remote controller is adopted to switch to a quadrotor mode and send a command of take-off to the bait feeding boat.

Step 12, The bait feeding boat is enabled to take off and move to another pond.

Further, the propulsion devices of the present disclosure are both integrally designed and have respective microprocessors. Therefore, another feature of the present disclosure lies in processing on the host and the slave. The step 3 specifically includes the following steps.

Step a, A power switch of the slave is turned on, such that a RGB lamp on the main control board having the slave flashes in a green color.

Step b, After waiting for 30 seconds, a power switch of the host is turned on.

Step c, if a match between the host and the slave is completed, a buzzer on the main control board having the host and a buzzer on the main control board having the slave give prompts, and the RGB lamp is kept on in a green color constantly; and if the match fails, a power cut is performed for resetting and rematch.

What is claimed is:

1. An agricultural amphibious bait feeding boat capable of moving between ponds, comprising a boat body, wherein a bait feeding device is fixed to one end of the boat body, and a propulsion device is fixed to the other end of the boat body;

the boat body comprises two foam floating bodies, foam fixing carbon rods, a transverse carbon rod, tube ferrule fixing assemblies, and tee joints, wherein the two foam floating bodies comprise a left foam floating body and a right foam floating body, the foam fixing carbon rods parallel to each other are respectively arranged above the two foam floating bodies, and the foam floating bodies and the foam fixing carbon rods are fixed through the tube ferrule fixing assemblies; and the transverse carbon rod is connected to the foam fixing carbon rods through the tee joints, such that an overall structure is in an H shape, and the left foam floating body and the right foam floating body are fixedly connected to each other;

the bait feeding device comprises a bait feeding mechanism, a microprocessor for controlling bait feeding, a bait feeding mechanism fixing plate, quick release extension rods, tube clamps, and quick release assemblies, wherein the microprocessor for controlling bait feeding is located above the bait feeding mechanism; the bait feeding mechanism is fixed to the bait feeding mechanism fixing plate via a screw hole; the quick release extension rods are fixedly connected to the bait feeding mechanism fixing plate through the tube clamps, and the quick release extension rods are fixedly connected to the quick release assemblies, respectively; and the propulsion device comprises a rotating mechanism, rotating mechanism fixing rods, a main rod of the propulsion device, short connecting rods, a main control fixing plate, a battery fixing plate, tube clamps, and a nylon column, wherein each of the short connecting rods has one end connected to a respective one of the foam fixing carbon rods through a respective one of quick release assemblies, and the other end connected to the main rod of the propulsion device through a respective one of tee joints; the battery fixing plate is fixed to the main rod of the propulsion device through the tube clamps for an arrangement of a battery and other components; the main control fixing plate is erected at a center of the battery fixing plate with the nylon column for an arrangement of a main control board; a left end and a right end of the main rod of the propulsion device are respectively provided with the tee joints, and are perpendicularly connected to the rotating mechanism fixing rods, respectively; and the rotating mechanism fixing rods are connected to the rotating mechanism.

2. The agricultural amphibious bait feeding boat capable of moving between ponds according to claim 1, wherein each of the foam floating bodies is cylindrical and has a length of 1 m and a diameter of 33 cm; and an upper portion of each of the foam floating bodies is cut to form an 18 cm wide platform to be fixed to a respective one of the foam fixing carbon rods.

3. The agricultural amphibious bait feeding boat capable of moving between ponds according to claim 1, wherein each of the quick release assemblies comprises a quick release threaded tube, a quick release pin tube, and a threaded flange, wherein two recessed positioning holes are formed in a bottom of the quick release threaded tube, and correspond to two pins protruding from a top surface of the quick release pin tube; during fixing, the pins are respectively inserted into the recessed positioning holes to ensure that the quick release threaded tube and the quick release pin tube are unable to rotate relative to each other; and then the threaded flange is fixed to a lower threaded surface of the quick release threaded tube in a direction of the quick release pin tube, and the quick release threaded tube and the quick release pin tube are completely fixed by a baffle plate below the threaded flange; and during disassembly, the threaded flange is detached along threads of the quick release threaded tube, and the quick release threaded tube and the quick release pin tube are separated from each other.

4. The agricultural amphibious bait feeding boat capable of moving between ponds according to claim 1, wherein each of the tube ferrule fixing assemblies comprises a tube ferrule, tube ferrule fixing plates, tube clamps, and M3 screws, wherein a stainless steel strip is used as the tube ferrule, and four holes are reserved at each of two ends of the tube ferrule, and are matched with a respective one of the tube ferrule fixing plates; four holes are formed in each of the tube ferrule fixing plates, and distances between the four holes correspond to distances between holes in the tube clamps; and each of the M3 screws sequentially penetrates through a respective one of the tube clamps, and the two ends of the tube ferrule and the tube ferrule fixing plates that are symmetrical with respect to the respective one of the tube clamps, and is tightened by a nut, such that each of the foam floating bodies and a respective one of the foam fixing carbon rods are fixedly connected to each other.

5. The agricultural amphibious bait feeding boat capable of moving between ponds according to claim 1, wherein the transverse carbon rod is connected to the foam fixing carbon rods through the tee joints, screws having a length of 35 mm, and nuts.

6. The agricultural amphibious bait feeding boat capable of moving between ponds according to claim 1, wherein the rotating mechanism comprises mechanical parts and an electric connection part; wherein each of the mechanical parts comprises a motor, a propeller blade, a motor base plate, a foldable component base plate, a tube clamp, an umbrella-shaped foldable component, a foldable component fixing plate, and a fixing aluminum component, wherein the propeller blade is fixed to a shaft end of the motor; the motor is fixed to the motor base plate; the foldable component base plate is connected to the motor base plate through the tube clamp, and the foldable component base plate is perpendicularly connected to the foldable component fixing plate through the fixing aluminum component; the foldable component fixing plate is provided with a screw hole matched with the umbrella-shaped foldable component, such that the umbrella-shaped foldable component is fixed to the foldable component fixing plate through a screw; and the umbrella-shaped foldable component is fixed to a respective one of the rotating mechanism fixing rods by punching a hole and screwing through the hole; and the electric connection part comprises a battery, two electronic speed controllers, a power distribution board, a voltage reduction module, and a main control board, wherein the battery is connected to the power distribution board; multiple power supplies from the power distribution board are respectively connected to the electronic speed controllers and the voltage reduction module; the voltage reduction module reduces a voltage of the battery and then connects the battery to the main control board; wires led from the power distribution board are connected to the two electronic speed controllers; each of the electronic speed controllers converts a direct current into a three-phase current, and is connected to the respective motor through a wire to adjust a rotation speed of the propeller blade; and the main control board adjusts and controls a rotation speed of the propulsion device according to sensor data, such that an attitude of the boat body is kept stable; the battery fixing plate is fixed to the main rod of the propulsion device through the tube clamps at an included angle of 90° to a ground; the electronic speed controllers, the power distribution board, the battery, and the voltage reduction module are sequentially fixed to the battery fixing plate through M3 screws or double-sided adhesives; the main control fixing plate is erected with the nylon column through an M3 screw, and is fixed to the center of the battery fixing plate; and the main control board is bonded to the main control fixing plate through a double-sided adhesive; and the power distribution board, the electronic speed controllers, and the main control board are subjected to water repellent treatment to a predetermined extent.

7. The agricultural amphibious bait feeding boat capable of moving between ponds according to claim 6, wherein an angle of the umbrella-shaped foldable component is arbitrarily adjusted from 0° to 90°; when the boat body is shifted from a mode of bait feeding to a mode of moving between ponds, the bait feeding device is detached, and another propulsion device is mounted; and after the angle of the umbrella-shaped foldable component is manually adjusted, the motor is allowed to rotate to provide a lift force.

8. A method for controlling the agricultural amphibious bait feeding boat capable of moving between ponds according to claim 6, comprising the following steps:

step 1, turning on a main power switch to power on the motor and the main control board;

step 2, adjusting a throttle value on a remote controller to a minimum value, and controlling the motor to have a basic rotation speed by the main control board through a respective one of the electronic speed controllers;

step 3, taking a microprocessor on the main control board of the propulsion device as a host by default, and taking the microprocessor on a main control board of the bait feeding device as a slave by default;

step 4, solving the attitude of the boat body and transmitting data to the microprocessor as the host by an inertial measurement unit (IMU) based attitude estimation module on the host, and displaying the data on a serial port screen by the microprocessor as the host;

step 5, analyzing and processing the transmitted data by the microprocessor as the host to adjust and control a rotation speed of the motor by proportion integration differentiation (PID), so as to make the boat body smoothly move forwards in a whole; wherein when the boat body smoothly moves forwards, turning and bait feeding are fulfilled by the remote controller;

step 6, sending commands for the turning and the bait feeding by the remote controller;

step 7, receiving data and transmitting the data to the main control board having the host by a remote controller receiving module; and step 8, adjusting, according to the commands, an attitude expectation of the boat body by the main control board having the host, and sending a command by the main control board having the host to the slave to control the motor or the bait feeding mechanism.

9. The method for controlling the agricultural amphibious bait feeding boat capable of moving between ponds according to claim 8, further comprising a step of mounting two propulsion devices to make the agricultural amphibious bait feeding boat rapidly move between ponds, comprising the following steps:

step 9, detaching the bait feeding device, mounting another one of the propulsion devices, and rotating an orientation of each motor;

step 10, configuring the host and the slave;

step 11, switching to a quadrotor mode by using the remote controller, and sending a command of take-off to the agricultural amphibious bait feeding boat; and step 12, enabling the agricultural amphibious bait feeding boat to take off and move to another pond.

10. The method for controlling the agricultural amphibious bait feeding boat capable of moving between ponds according to claim 8, wherein the step 3 comprises the following steps:

step a, turning on a power switch of the slave, such that a red-green-blue (RGB) lamp on the main control board having the slave flashes in a green color;

step b, after waiting for 30 seconds, turning on a power switch of the host; and step c, if a match between the host and the slave is completed, giving prompts by a buzzer on the main control board having the host and a buzzer on the main control board having the slave, and keeping the RGB lamp on in the green color constantly; and if the match fails, performing a power cut for resetting and rematch.

\* \* \* \* \*